June 8, 1954

M. C. SHAW ET AL
DIFFERENTIAL PRESSURE MEASURING
DEVICE WITH RING DYNAMOMETER
Filed Jan. 10, 1952

2,680,376

INVENTORS
Milton C. Shaw
Charles D. Strang, Jr.

BY Ralph L Chappell

ATTORNEY

Patented June 8, 1954

2,680,376

UNITED STATES PATENT OFFICE 2,680,376

DIFFERENTIAL PRESSURE MEASURING
DEVICE WITH RING DYNAMOMETER

Milton C. Shaw, Lexington, Mass., and Charles D.
Strang, Jr., Fond du Lac, Wis.

Original application August 24, 1945, Serial No.
612,520. Divided and this application January
10, 1952, Serial No. 265,912

9 Claims. (Cl. 73—398)

(Granted under Title 35, U. S. Code (1952),
sec. 266)

1

This invention relates to improvements in force and pressure measuring devices, and this is a divisional application of Serial No. 612,520, filed on August 24, 1945, now abandoned.

An object of this invention is to provide a force and pressure measuring device which includes a housing supporting one or more strainable rings which have strain-sensitive wire gages connected thereto and embodied in a balanced circuit, together with diaphragm or pressure chambers arranged on opposite sides of the rings so that pressures may be applied to the rings in the chambers and through the action of the rings and the circuit, the differential between the pressures measured and/or indicated.

A more specific object of the invention is to provide a device as above, which has two ring chambers with breather openings exposing the ring chambers to atmospheric pressure, and which has the diaphragms of the pressure chambers forming a common wall between the pressure chambers and the ring chambers. Since the rings in the ring chambers are in contact with the diaphragms, upon application of forces to the diaphragms, the rings are stressed, whereby an indication or measurement of ring strain may be taken from an indicator connected to a Wheatstone bridge which constitutes a part of the aforementioned circuit.

Other objects and features will become apparent in following the description of the illustrated embodiment of the invention.

In this application the term "ring" is used in a broad sense to comprehend a closed continuous curved beam of any configuration or cross-section. In our illustrated embodiment, a ring of circular configuration is used since it represents the most simple and most easily fabricated of all dynamometer ring structures. The term "wire" as used herein, comprehends a ribbon, sheet, bar or any other form or configuration of strain-sensitive means.

Figure 1:
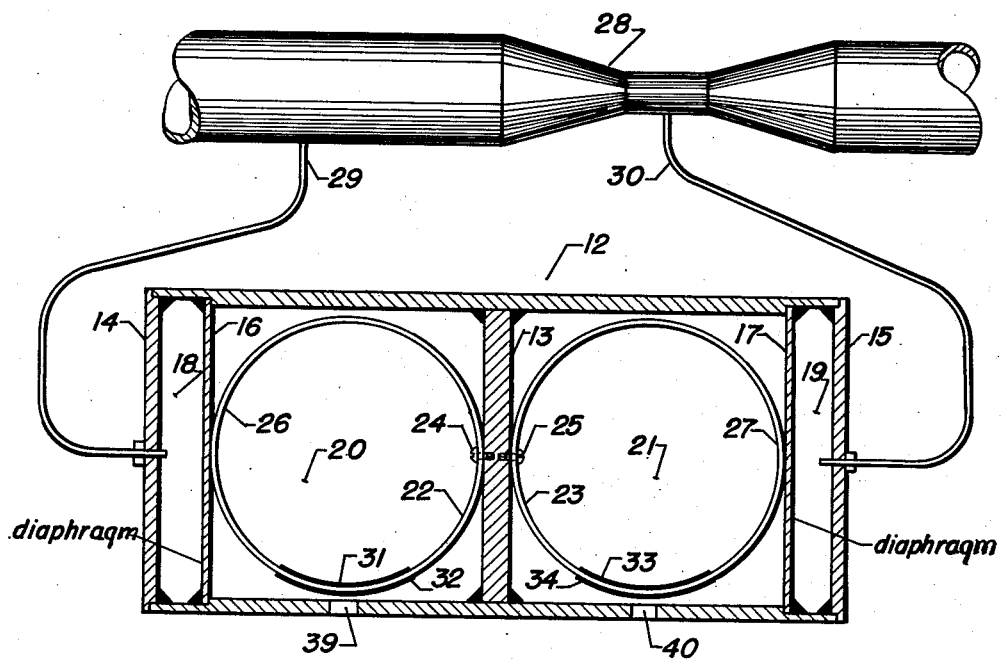
Fig. 1 is a longitudinal sectional view of the device and shows connected to the device, a conduit wherein there would be a differential in pressures.

In Fig. 1 a differential pressure measuring device is shown, and includes a rigid housing or housing structure 12 of rectangular form, transversely partitioned by a fixed, stiff wall 13. End plates 14 and 15 form the ends of the housing

2

12 and are held in place by any standard sealing means, as by welding or bolting with appropriate seals employed. Diaphragms 16 and 17 are secured to the housing and extend tranversely across it to provide pressure chambers 18 and 19 near the ends of the housing. The diaphragms are soldered or otherwise fastened to the housing in an air-tight fashion in order that the chambers 18 and 19 may be hermetically sealed. Each of the diaphragms forms a common wall for its pressure chamber and one of the ring chambers 20 and 21, the latter chambers being separated from each other by the wall 13. Dynamometer rings 22 and 23 are disposed in the chambers 20 and 21 and are held fastened to the wall 13 by conventional means, as the screws 24 and 25. The rings 22 and 23 are of such diameter that their outer surfaces are contacted by the diaphragms 16 and 17 in the ring zones 26 and 27.

Figure 2:
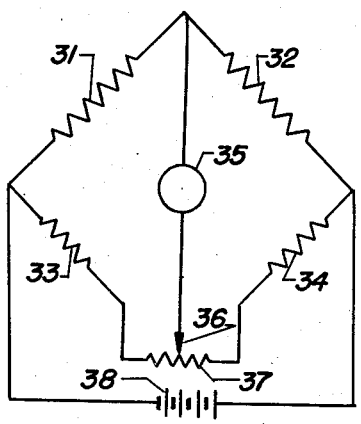
Fig. 2 is a wiring diagram of a Wheatstone bridge circuit embodying the strain-sensitive wire gage elements of Fig. 1.

The rings 22 and 23 are provided with wire strain gages 31, 32 and 33, 34. The gages 31 and 32 are cemented or otherwise fastened to the inner and outer surfaces of the ring 22 at a point quadrature spaced from the zone 26, whereas the gages 33 and 34 are fastened to the inner and outer surfaces of the ring 23 at a point quadrature spaced from the zone 27 thereof. These gages are embodied in a Wheatstone bridge as adjacent arms 31, 32, 33 and 34 thereof as shown in Fig. 2. Any known potential responsive indicating device 35 is connected across the bridge in a conventional way and is associated with a sliding contact 36 and a trimmer resistance 37 for balancing the bridge. Battery 38 is connected across the circuit in the usual manner to energize the circuit and any departure from a predetermined reference point of the indicating device 35 serves to detect a strain in the wire gages, the magnitude of which is easily ascertainable by suitable calibration of the indicating device 35.

One of the difficulties commonly met in the use of strain measuring elements is the effect of a temperature differential between the respective arms of the electrical bridge circuit. This results in a change of resistance without an accompanying change of force or displacement of the measuring system, a condition referred to as zero drift. In order that zero drift be completely eliminated, it is essential that the pairs of strain measuring elements 31, 32 and 33, 34 be kept at the same temperature. This is conveniently accomplished by placing adjacent bridge elements on adjacent surfaces of the dynamometer rings as shown in Fig. 1. Furthermore, the use of a closed ring of symmetrical design provides equal parallel paths from one end fixture to the other, thus tending to keep all strain gages at the same temperature level. Numerous dynamometer rings constructed in the manner of the foregoing description have proved to be completely free of zero drift when operated under a wide range of temperature conditions, even though the gages employed were constructed of wire having a high change in resistance with temperature.

By employing four active strain measuring elements as the respective arms in the electrical bridge circuit as shown in Fig. 2, maximum change of resistance and therefore maximum strain measuring sensitivity is obtained. In addition to the foregoing advantages embracing temperature compensation and maximum strain measuring sensitivity, a closed continuous curved beam is convenient, compact and easily applied to the measurement of forces and linear displacement. By proper choice of material and range of operation, the output of the bridge circuit may be made to vary linearly with the applied force or linear displacement.

In discussing the practical use of the device, the assumption is made that the pressure differential existing between two points of fluid flow in a conduit 28, is to be ascertained. Tubes 29 and 30 are placed in communication with the stream of fluid in the conduit at those points and are communicated with the chambers 18 and 19 by securing the tubes in apertures of the end plates 14 and 15. Accordingly the diaphragms 16 and 17 are subjected to the fluid pressures of the fluid at the arbitrarily chosen points of the conduit 28. Since the diaphragms 16 and 17 are flexible and the chambers 20 and 21 of which they form a wall are vented by the conductor passages 39 and 40, the diaphragms will yield and transmit the pressures in the chambers 18 and 19 to the rings 22 and 23. The force applied to the rings in this manner causes the gages to be stressed, hence they are strained, which strain is transmitted to the attached strain gages 31, 32 and 33, 34, whereby a change of resistance in the strain-sensitive wire gages is produced. Since the pressure chambers 18 and 19 are subjected to different pressures, the flexural strain in the rings 22 and 23 will differ and the effect on the resistance of the gages will differ. Having had the bridge circuit originally balanced, the resulting resistance difference caused by change of strain in the gages will be indicated on the device 35 by its departure from the balancing point.

While two chambers and rings are shown, it is apparent that one chamber and ring may be used to measure a single pressure directly. Also, the device being capable of measuring pressures, it may be used to measure a force or forces. It is also apparent that various modifications may be made without departing from the scope and purview of the following claims.

The invention described herein may be manufactured and used by or for the Government of the United States of America for governmental purposes without the payment of any royalties thereon or therefor.

We claim:

1. A device to measure the differential between two pressures, said device comprising a housing having a first diaphragm isolating a part of said housing to form a first pressure chamber, a second diaphragm isolating another part of said housing to form a second pressure chamber, a pair of elastic dynamometer rings located in said housing and arranged in abutting strainable relation with said diaphragms, means stationarily supporting said rings in said housing, means including wire gages disposed on said rings for measuring the differential strain in said rings in response to the differential pressures applied to said diaphragms, and a balanced circuit including an indicator and having said wire gages therein for indicating the differential between said two pressures.

2. The measuring device of claim 1 and, said supporting means comprising a wall together with fastening elements holding said rings secured to said wall.

3. The measuring device of claim 1 and, each ring having a pair of said wire gages fastened thereto, one gage of each pair being connected to the inner surface of one ring and the other gage thereof being fastened to the outer surface of the last mentioned ring.

4. In a pressure measuring device, a housing having a strainable elastic ring disposed therein, strain sensitive wire gages disposed on said ring, means holding said ring in said housing, a diaphragm dividing a part of said housing into a pressure chamber, means for applying an unknown pressure to said chamber to displace said diaphragm said diaphragm being operatively and strainably connected to said ring so that the displacement of said diaphragm stresses said ring, and means connected to said gages for indicating the pressure in said chamber as a function of the strain of said ring.

5. In a fluid pressure dynamometer, a rigid structure having a hermetically sealed chamber, a portion of said chamber being flexible, and said chamber being adapted to communicate with fluid under pressure; a strainable elastic ring mounted on said structure and being abuttably and strainably engaged with said flexible portion; and electrical indicating means responsive to strain in said ring.

6. In a fluid pressure dynamometer, a rigid structure having hermetically sealed chambers, a portion of each chamber being flexible, and said chambers being adapted to communicate with fluid under pressure; strainable elastic rings mounted on said structure, each ring being abuttably and strainably engaged with the flexible portion of a chamber; and electrical indicating means responsive to differential strain in said rings.

7. In a fluid pressure dynamometer, a rigid structure having hermetically sealed chambers, a portion of each chamber being flexible, and said chambers being adapted to communicate with fluids under pressure; strainable elastic rings mounted on said structure, each ring being abuttably and strainably engaged with the flexible portion of a chamber; strain-sensitive wire means mounted on said rings; and a balanced circuit associated with said strain-sensitive wire means for measuring differential strain in said rings.

8. In a fluid pressure dynamometer, a rigid structure having hermetically sealed chambers, a portion of each chamber being flexible, and said chambers being adapted to communicate with fluids under pressure; strainable elastic rings mounted on said structure, each ring being abuttably and strainably engaged with the flexible portion of a chamber; strain-sensitive wire gages mounted on the inner and outer peripheries of said rings at corresponding points of said rings; and a Wheatstone bridge embodying said strain-sensitive wire gages for measuring the differential strain in said rings.

9. In a dynamometer, a structure having a hermetically sealed chamber, a portion of said chamber being flexible, said chamber being adapted to communicate with fluid under pressure; a strainable elastic ring mounted on said structure and being abuttably and strainably engaged with said flexible portion; strain-sensitive wire means mounted on said ring; and a balanced circuit embodying said strain-sensitive wire means for measuring the strain in said strain-sensitive wire means.

References Cited in the file of this patent

UNITED STATES PATENTS

| Number | Name | Date |
|---|---|---|
| 1,528,627 | Peters | Mar. 3, 1925 |

OTHER REFERENCES

Theis, Aircraft Engineering, April 1943, pp. 106, 107, and 108.